United States Patent
Ungerman

(10) Patent No.: US 8,990,708 B2
(45) Date of Patent: Mar. 24, 2015

(54) USER GENERATED MEDIA LIST INTERFACES WITH SOCIAL NETWORKING

(75) Inventor: Jason C. Ungerman, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 655 days.

(21) Appl. No.: 12/657,803

(22) Filed: Jan. 27, 2010

(65) Prior Publication Data
US 2011/0138304 A1    Jun. 9, 2011

Related U.S. Application Data

(60) Provisional application No. 61/283,872, filed on Dec. 9, 2009.

(51) Int. Cl.
| | |
|---|---|
| G06F 3/00 | (2006.01) |
| G06F 3/048 | (2013.01) |
| G06Q 30/02 | (2012.01) |
| G06F 3/0486 | (2013.01) |
| G06F 17/30 | (2006.01) |

(52) U.S. Cl.
CPC ............ G06Q 30/02 (2013.01); G06F 3/0486 (2013.01); G06F 17/30867 (2013.01)
USPC ........................................................ 715/753

(58) Field of Classification Search
CPC .. G06Q 30/02; G06F 3/0486; G06F 17/30867
USPC .......................................... 715/751, 753, 769
See application file for complete search history.

(56) References Cited

U.S. PATENT DOCUMENTS

| | | | |
|---|---|---|---|
| 2008/0091771 A1* | 4/2008 | Allen et al. | 709/203 |
| 2008/0281712 A1* | 11/2008 | Fuzell-Casey et al. | 705/14 |
| 2008/0288494 A1* | 11/2008 | Brogger et al. | 707/7 |
| 2008/0291899 A1* | 11/2008 | Gromoll et al. | 370/352 |
| 2009/0193351 A1* | 7/2009 | Lee et al. | 715/769 |
| 2009/0307314 A1* | 12/2009 | Smith et al. | 709/206 |
| 2010/0250399 A1* | 9/2010 | Williams et al. | 705/27 |

* cited by examiner

Primary Examiner — Kieu Vu
Assistant Examiner — Aaron Lowenberger
(74) Attorney, Agent, or Firm — Farjami & Farjami LLP

(57) ABSTRACT

There are provided interfaces for user generated media lists with social networking. There is provided a method for providing an interface on a display for user generated media lists with social networking, the method comprising: presenting, on the display, a plurality of media assets for selection into a user media list, determining that the user media list is fully populated, receiving a request to share the user media list through a social networking service, validating credentials for a user account to be associated with the user media list, generating a unique locator for viewing of the user media list, and sending an update including the unique locator via the social networking service. In this manner, users can leverage the dynamics of social networking to motivate others to create and share lists, providing a "viral" effect to drive additional traffic and create promotional opportunities.

18 Claims, 4 Drawing Sheets

USER GENERATED MEDIA LIST INTERFACES WITH SOCIAL NETWORKING

RELATED APPLICATIONS

This application claims priority to U.S. Provisional Application No. 61/283,872, filed on Dec. 9, 2009, which is hereby incorporated by reference in its entirety.

BACKGROUND OF THE INVENTION

1. Field of the Invention

The present invention relates generally to user interfaces. More particularly, the present invention relates to interfaces for user generated media lists.

2. Background Art

Internet access devices such as desktop and notebook computers, mobile phones, video game consoles, and other devices provide convenient ways for people to keep in contact with friends, family and associates and to access a wide variety of rich media, such as music and video content. With a wide variety of content, both amateur and professional, conveniently available with the click of a mouse button, media streaming over the Internet has become the preferred entertainment delivery method of choice for many people. Free from the set schedules and limited scope of content offered by traditional media delivery methods such as broadcast radio and television, more people are discovering that accessing media over the Internet better suits their needs and lifestyles. In particular, by providing robust community features such as video commenting, website embedding, keyword tagging, popularity rankings, link sharing, and other features, media streaming over the Internet can provide a level of compelling interactivity that is missing in traditional methods of content delivery.

The recent popularity of online social networking has also changed the way many people communicate, allowing people to broadcast new and exciting developments and receive feedback almost instantly with their online communities. This ease of communication facilitates the rapid promotion of media that people find interesting and want to share with others, spreading through e-mail, instant messages, social networking, websites, and other online outlets. By receiving a media link from an esteemed colleague or an influential personality rather than a corporate public relations person, people may be more receptive to viewing the media and sharing it with their own online social circle. This cascading "going viral" effect can generate tremendous exposure and publicity.

From the perspective of an Internet content provider, such viral effects may be desirable to promote brand awareness and to create additional advertising revenue. However, it is often difficult for commercial entities to create or initiate the "viral" effect as the phenomenon is largely spontaneous and initiated by users of their own volition. Moreover, attempts by commercial companies or marketers to create "viral" effects are often viewed by the Internet community as dishonest and may therefore backfire.

Accordingly, there is a need to overcome the drawbacks and deficiencies in the art by providing Internet content providers a way to encourage and initiate "viral" publicity effects for online media in a manner acceptable to the Internet community.

SUMMARY OF THE INVENTION

There are provided interfaces for user generated media lists with social networking, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to interfaces for user generated media lists with social networking. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
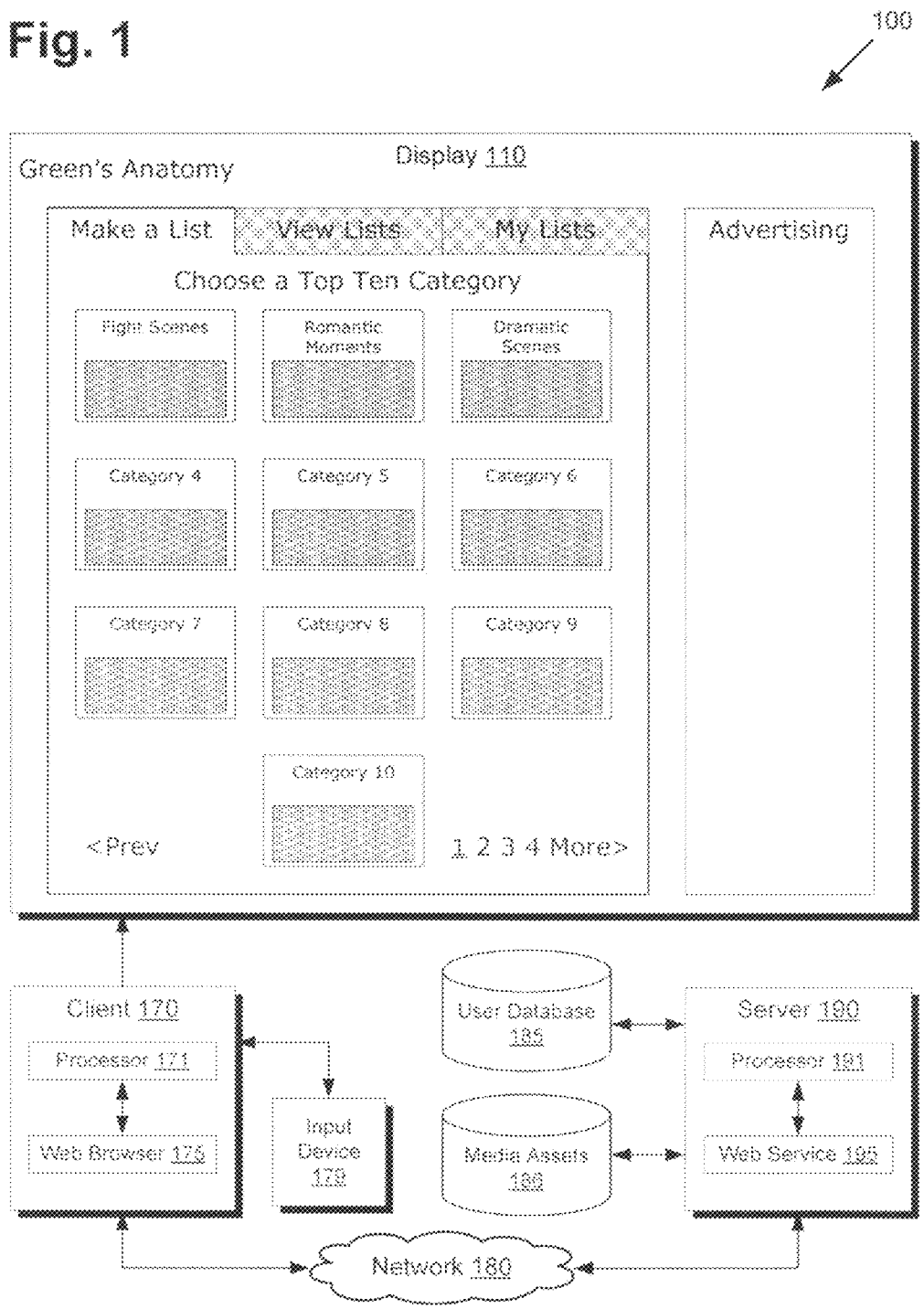
FIG. 1 presents a system for providing user generated media list interfaces with social networking, according to one embodiment of the present invention.

FIG. 1 presents a system for providing user generated media list interfaces with social networking, according to one embodiment of the present invention. Diagram 100 of FIG. 1 includes display 110, client 170, input device 179, network 180, user database 185, media assets 186, and server 190. Client 170 includes processor 171 and web browser 175. Server 190 includes processor 191 and web service 195.

Client 170 may comprise any device capable of connecting to server 190 via network 180, which may comprise a public network such as the Internet. Client 170 may thus comprise a personal computer, a mobile phone, a video game console, or any other device capable of executing web browser 175 on processor 171. Additionally, an input device 179 is connected to client 170, which may comprise, for example, a keyboard and a mouse, a game controller, or a digitizer for accepting touch or pen input for display 110.

Thus, a user may use input device 179 to point web browser 175 to server 190. As shown in FIG. 1, server 190 is executing web service 195 on processor 191, which may service web requests over Hypertext Transfer Protocol (HTTP). Additionally, web browser 175 might also support rich media plug-ins, such as Adobe Flash, Microsoft Silverlight, and Sun Java. Web service 195 may then provide applications and asset resources for these rich media plug-ins running on web browser 175. Server 190 has access to user database 185, which may contain user registration, profiles, tracking, and other personalization data. Server 190 also has access to media assets 186, which may include text, audio, pictures, videos, and other media resources.

After the user has directed web browser 175 to web service 195 running on server 190, which might be found using a Uniform Resource Locator (URL) or through a search engine, display 110 may show an interface similar to that shown in FIG. 1. The interface as depicted in FIG. 1 is simplified for reasons of clarity. Additionally, alternative embodiments may vary the layout and quantities shown in FIG. 1. For example, instead of "Top Ten" lists, "Top Five" lists or unordered, unranked lists may also be provided. Additionally, while ten categories are displayed at a time, alternative interface embodiments may show more or less, depending on design requirements.

For the examples depicted in FIG. 1 and subsequent Figures, a fictional medical drama "Green's Anatomy" is used for illustrative purposes. As shown in FIG. 1, the user is shown an interface where the user can select "Make a List", "View Lists", or "My Lists". In FIG. 1, the "Make a List" tab is selected, which further exhorts the user to select a "Top Ten Category" from a variety of thematic categories. The categories "Fight Scenes", "Romantic Moments", and "Dramatic Scenes" are given as examples. The remaining categories may also thematically match to the currently selected creative work, or "Green's Anatomy" in this case. The creative work may, for example, comprise a television drama, an awards show, a sports event, a movie, or any other type of show or program. As shown in FIG. 1, each category has an accompanying thumbnail image (shown as a gray rectangle), which might show a representative scene or an image that helps to suggest the particular category. For example, the category "Romantic Moments" might show characters of "Green's Anatomy" in an embrace, or it might more generally suggest romance using, for example, heart icons.

Figure 2:
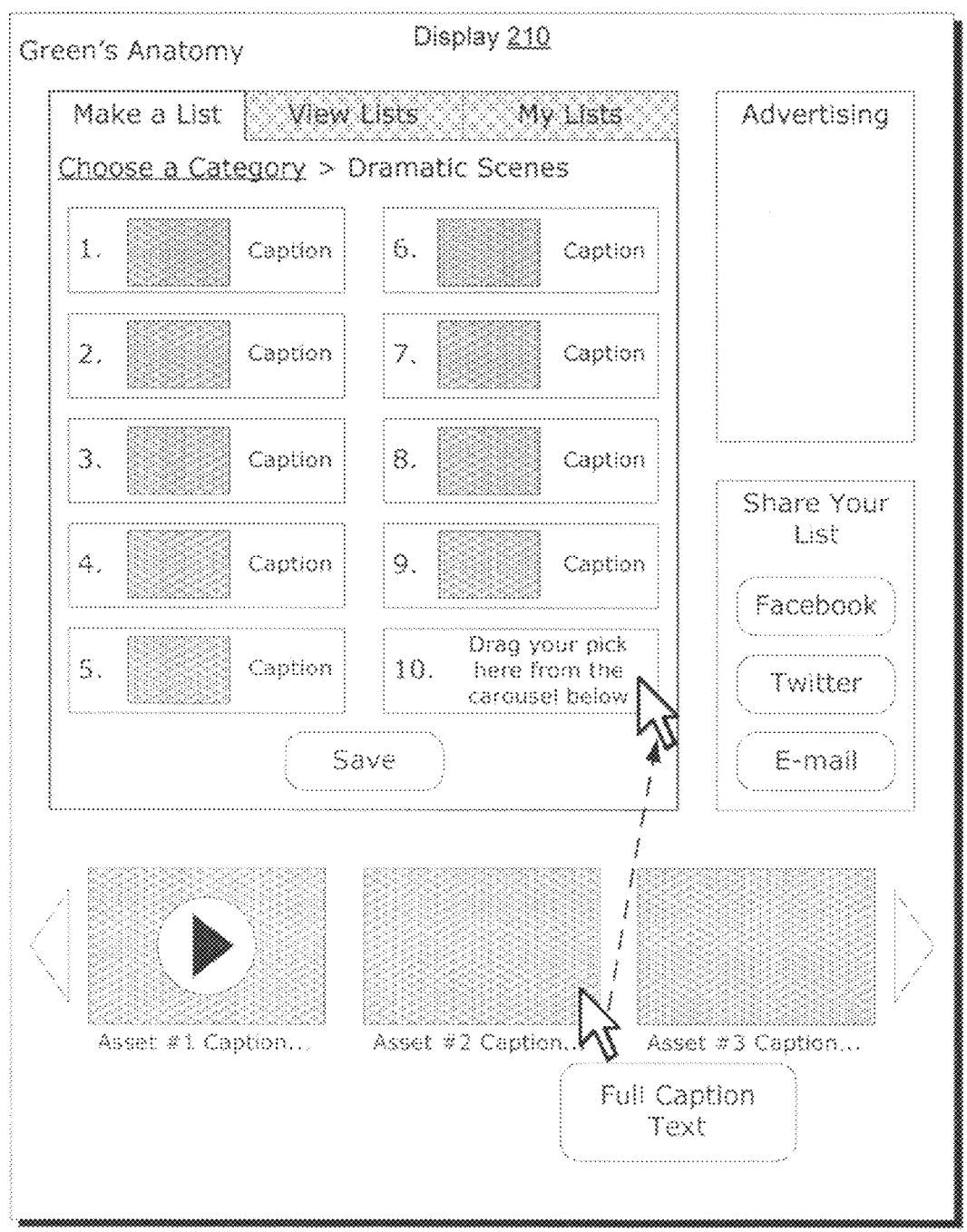
FIG. 2 presents a display showing an interface for creating user generated media lists with social networking, according to one embodiment of the present invention.

Moving to FIG. 2, FIG. 2 presents a display showing an interface for creating user generated media lists with social networking, according to one embodiment of the present invention. Diagram 200 of FIG. 2 includes display 210.

After the user clicks on the category labeled "Dramatic Scenes", display 110 in FIG. 1 may transition to an interface similar to one shown in display 210 in FIG. 2. As shown in FIG. 2, the user has already populated items 1 through 9 in the user generated list by dragging media assets from the carousel at the bottom of the interface. The media assets shown in the carousel may be stored in media assets 186 of FIG. 1 and may be preselected and prescreened as appropriate. Some embodiments may limit media assets 186 to preselected materials only. Alternative embodiments may allow for user generated content or external content, which may require moderation.

The drag and drop functionality may be implemented using rich media plug-ins or web scripting, and may conform to standard drag and drop user interface conventions. For example, dragging an asset between two items may push down higher numbered items, possibly deleting the last item if the list is already fully populated. Confirmation prompts may be provided if an action results in the removal of any items. Hovering a pointer over a media asset may display a floating caption window describing the asset in more detail, as shown. Additionally, the thumbnail may have a distinct visual appearance while dragging, such as being highlighted or made transparent. While a drag and drop interface is shown in FIG. 2, alternative embodiments may use different selection methods for populating the user generated list.

As shown in FIG. 2, each media asset is accompanied by a thumbnail. Since several types of media assets may be supported, thumbnails may be generated in various ways as well. For example, text resources such as character quotes may comprise an image of the speaker of the quote, a general placeholder image reserved for quotes, or the text converted to an image. For image resources, the thumbnail may simply be a rescaled version of the image. For video resources, the thumbnail may for example be a static image, a series of cycling static images, or a short video clip that may loop. For audio resources, the thumbnail may for example be an image based text transcript of the audio or a general placeholder image reserved for audio.

As shown by for example Asset #1, some media assets may indicate playback functionality to the user. If the user clicks on the media asset, a separate player window or a floating player widget may open and play the associated media, or the thumbnail may simply begin animating. From there, the user might be invited to watch the entire episode containing the particular media asset, and related e-commerce product links or websites might also be provided to the user. This playback functionality may also be provided for media assets populated in the user list.

Once the user generated media list is fully populated, the user may have the choice of saving the list by clicking the "Save" button, or sharing the list using a social networking service or e-mail, as shown in the right column. At this point, if the user is not already logged in and authenticated, the user may be prompted to enter in credentials for a user account, which may be checked against user database 185 in FIG. 1. For example, a user with an account name "JaneDoe123" may be already logged in through an authentication cookie stored by web browser 175 in FIG. 1, therefore avoiding the need to prompt for credentials such as the account name and password.

After saving the list, the list may be accessible when logged in as the "JaneDoe123" user account under the "My Lists" tab, which may support multiple lists in the same category. Clicking on one of the share options may automatically save the list as well. In either case, a unique reference may be generated, such as a URL hashed to be short for ease of distribution, which may be used to publically access and read the list. The list and the associated hash may then be stored in user database 185 of FIG. 1 for future reference. The hashed URL may then be embedded within a status update sent through an associated social networking account, such as a FACEBOOK® or TWITTER® account for "JaneDoe123", or sent directly to specified recipients through E-mail. An example status update might read, "I just made a top ten list of the most dramatic scenes from Green's Anatomy. Check it out and make your own! http://webserver.com/z13fgy", where "z13fgy" is the hash code. Optionally, scripts might be provided so that users can embed an image or a widget for posting on their personal website or blog, which redirects to the hashed URL. The status update or image/widget script may further include a portion of the list as a teaser to encourage following of the URL link back to the website. The share functionality might also use community features available internally through the website user registration system, such as user friend lists.

Figure 3:
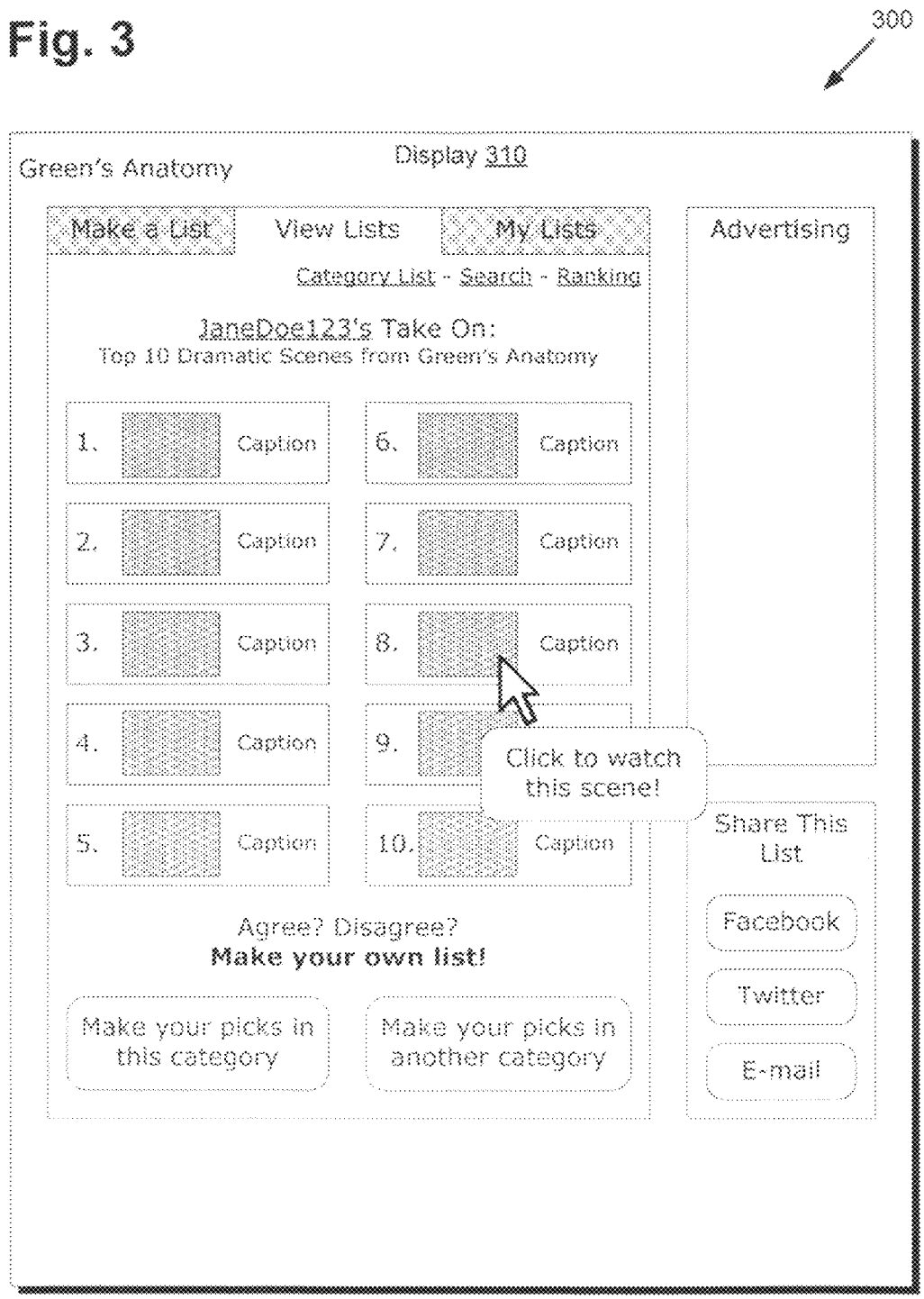
FIG. 3 presents a display showing an interface for displaying user generated media lists with social networking, according to one embodiment of the present invention.

Moving to FIG. 3, FIG. 3 presents a display showing an interface for displaying user generated media lists with social networking, according to one embodiment of the present invention. Diagram 300 of FIG. 3 includes display 310.

After another user receives and follows the hashed URL through the sharing feature discussed above, an interface similar to that shown in display 310 may appear. As shown in FIG. 3, the top ten picks as selected by the user "JaneDoe123" are listed with thumbnails. Clicking on a thumbnail may open a separate player window or overlay, as previously discussed. Furthermore, the user is encouraged to create his own list to express his opinions, or to share the list again with his own social network using the provided sharing functions.

Additionally, as shown by the navigation above, a "Ranking" feature may also be implemented, which may present aggregated list results using all data from registered users. For example, by assigning weighted point values for each asset in each list contributed by each user, each particular category or group of categories may be compiled into an aggregate "as selected by the fans" ranking by selecting the assets with the highest point totals, providing an overview of the most popular scenes for a given category or categories. Particular "expert" user lists of interest may also be highlighted by the website, for example the personal user lists of production staff, acting talent, critics, or other persons that may have special insights. The "Search" feature may provide features such as finding a particular user's lists, or finding users with matching list tastes. The "Category List" may bring up an interface similar to that shown in display 110 of FIG. 1, except that the "View Lists" tab is highlighted rather than the "Make a List" tab. In this manner, users may be presented with a wide variety of list opinions and thus become motivated to create their own lists to express their own personal opinion or to change the overall ranking.

As previously discussed, the interfaces shown are simplified for explanatory purposes. Alternative embodiments may include additional social networking and communication features to encourage interaction. For example, users may be enabled to post comments regarding their list choices, link to other user lists, or participate in chat or message boards. By providing saving and sharing of user media lists that can be promoted using social networking, the "viral" effect can be encouraged by leveraging the desire to express one's opinions or view or influence the opinions of others, resulting in increased visitor traffic, brand awareness, and website user retention. Moreover, these user actions may be tracked and analyzed to provide better targeting for promotions or other initiatives.

Figure 4:
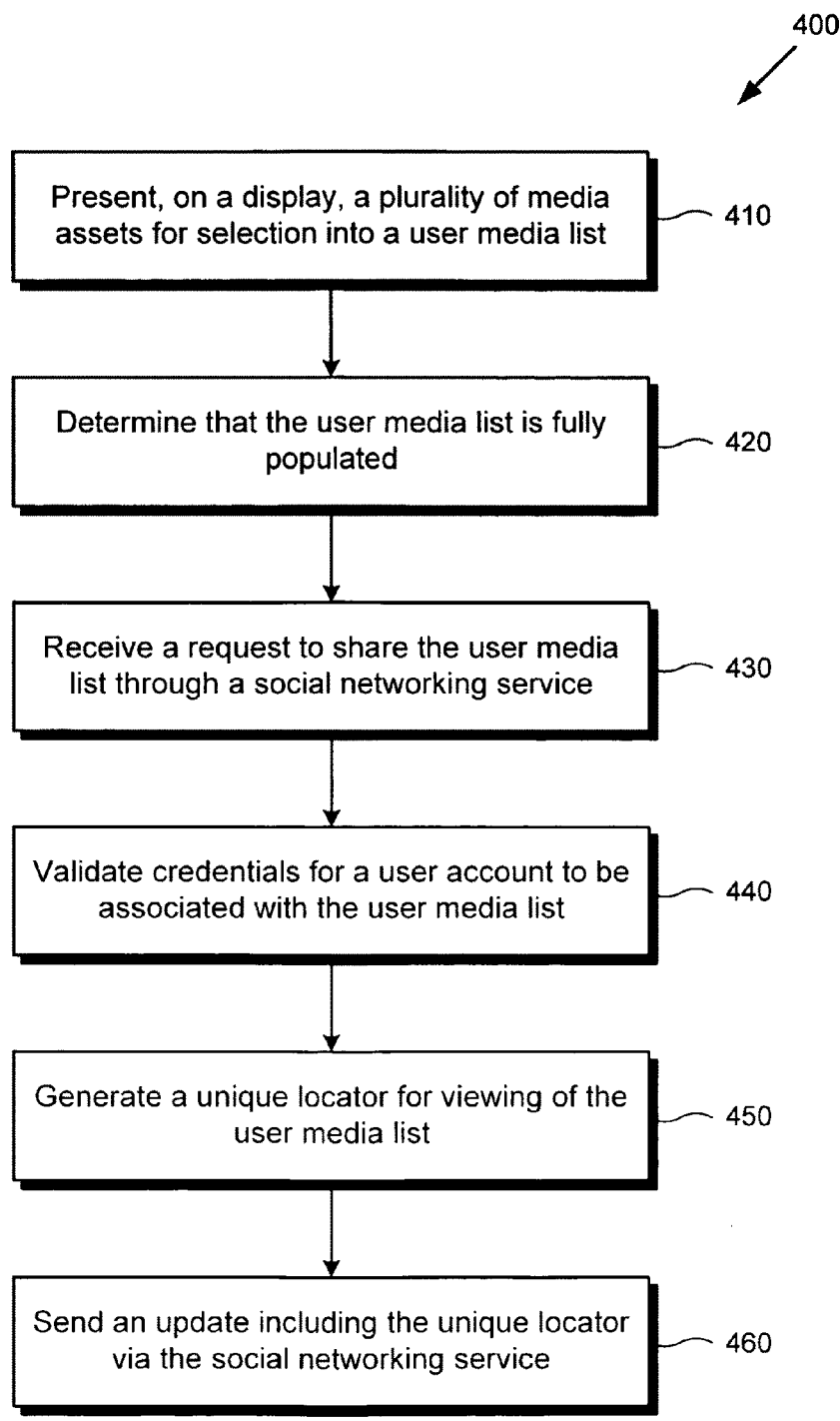
FIG. 4 shows a flowchart describing the steps, according to one embodiment of the present invention, by which a server can provide user generated media list interfaces with social networking.

FIG. 4 shows a flowchart describing the steps, according to one embodiment of the present invention, by which a server can provide user generated media list interfaces with social networking. Certain details and features have been left out of flowchart 400 that are apparent to a person of ordinary skill in the art. For example, a step may comprise one or more sub-steps or may involve specialized equipment or materials, as known in the art. While steps 410 through 460 indicated in flowchart 400 are sufficient to describe one embodiment of the present invention, other embodiments of the invention may utilize steps different from those shown in flowchart 400.

Referring to step 410 of flowchart 400 in FIG. 4, diagram 100 of FIG. 1, and diagram 200 of FIG. 2, step 410 of flowchart 400 comprises server 190 presenting a plurality of media assets for selection into a user media list using the interface shown on display 210 of FIG. 2. This may be accomplished, for example, by processor 191 executing web server 195 which provides a Flash application for execution on a Flash plug-in of web browser 175 executing on processor 171 of client 170. The Flash plug-in may then render a drag and drop interface on display 110, which corresponds to display 210 in FIG. 2. Alternatively or additionally, web service 195 and web browser 175 may communicate using asynchronous JavaScript and XML (AJAX) to provide drag and drop interface functionality. As shown in display 210, a plurality of assets are selectable from the bottom carousel, which may be clicked and dragged into the user media list occupying the "Make a List" tab of the interface.

Referring to step 420 of flowchart 400 in FIG. 4, diagram 100 of FIG. 1, and diagram 200 of FIG. 2, step 420 of flowchart 400 comprises server 190 determining that the user media list shown on display 210 of FIG. 2 is fully populated. For example, an event listener may be implemented such that once a 10th item is added to the user media list, server 190 is notified that the present user media list is fully populated. Likewise, an event listener may be added to detect whether an item is deleted while the user media list is fully populated. Assuming that the drag and drop operation in progress as shown in display 210 is completed, step 420 may proceed to determine that the user media list is fully populated with media assets presented from step 410.

Referring to step 430 of flowchart 400 in FIG. 4, diagram 100 of FIG. 1, and diagram 200 of FIG. 2, step 430 of flowchart 400 comprises server 190 receiving a request to share the user media list populated from step 420. For example, if the user clicks on the "TW1TTER®" button in the "Share Your List" section, server 190 may understand that as a request to share the list from step 420 using an associated TWITTER® login. If TWITTER® login details are not already stored in user database 185, the user may be prompted to enter in TWITTER® login details to complete the request. A similar process may be used for FACEBOOK®, E-mail, and other social networking services.

Referring to step 440 of flowchart 400 in FIG. 4 and diagram 100 of FIG. 1, step 440 of flowchart 400 comprises server 190 validating a user account stored in user database 185 to be associated with the user media list populated in step 420. If the user has previously logged onto server 190, then step 440 is already finished. Alternatively, web browser 175 may already contain an authentication cookie from a previous session, which may be retrieved and validated as part of step 440. If none of these options are available, then the user may be prompted in a separate window to provide credentials, such as a username and password, which would be checked against user database 185.

Referring to step 450 of flowchart 400 in FIG. 4 and diagram 100 of FIG. 1, step 450 of flowchart 400 comprises server 190 generating a unique locator for the viewing of the user media list from step 420. As previously discussed, the URL may be shortened using hashing techniques so that the URL is as short as possible, allowing unobtrusive insertion into status update messages, websites, instant messages, chat rooms, and other online forums where long unwieldy URLs may be distracting. The unique locator may then be stored in user database 185 using the user account validated in step 440. The user media list itself may also be stored in user database 185 or may be encoded as part of the URL.

Referring to step 460 of flowchart 400 in FIG. 4 and diagram 100 of FIG. 1, step 460 of flowchart 400 comprises server 190 sending an update including the URL from step 450 using the social networking service requested from step 430. Thus, a status update may be sent using TWITTER® that includes the URL generated in step 450. As previously described, the status update may identify a thematic category of a creative work for the user media list, and may include a few items from the list as a "teaser" to encourage friends and followers to read the rest of the list by following the provided URL, which may appear similar to the interface shown on display 310 of FIG. 3.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for providing an interface on a display for user generated media lists with social networking, the method comprising:
    receiving a selection of a creative work by a user;
    presenting, on the display, a predetermined plurality of categories related to themes of the creative work;
    receiving a selection of a category from the predetermined plurality of categories by the user;
    presenting, on the display, in response to the selection of the category from the plurality of categories by the user, a predetermined plurality of media assets relating to the category for selection into a user media list and a plurality of social networking services for sharing the user media list, wherein the user media list includes a predetermined number of items such that when a last media asset is added to a last item of the user media list the user media list is fully populated;
    receiving a notification that the user media list is fully populated when a media asset of the plurality of media assets is added to the last item of the user media list;
    receiving a request to share the user media list through a social networking service from the plurality of social networking services;
    validating credentials for a user account to be associated with the user media list;
    generating a unique locator for viewing of the user media list;
    sending an update including the unique locator via the social networking service; and
    enabling communication features regarding the user media list.

2. The method of claim 1, wherein the selection into the user media list is by a drag and drop interface.

3. The method of claim 1, wherein the plurality of media assets includes external content.

4. The method of claim 1, wherein the communication features include allowing users of the social networking service to create another user media list from the plurality of media assets relating to the category, wherein the another media list includes the predetermined number of items.

5. The method of claim 1, wherein the social networking service comprises a blog.

6. The method of claim 1, wherein the social networking service comprises a personal user website.

7. The method of claim 1, wherein the unique locator comprises a hashed Universal Resource Locator (URL).

8. The method of claim 1 further comprising:
    storing the user media list in a database.

9. The method of claim 1, wherein the update further includes a portion of the user media list.

10. A server for providing an interface on a display for user generated media lists with social networking, the server comprising:
    a processor configured to:
        receive a selection of a creative work by a user;
        present, on the display, a predetermined plurality of categories related to themes of the creative work;
        receive a selection of a category from the predetermined plurality of categories by the user;
        present, on the display, in response to the selection of the category from the predetermined plurality of categories by the user, a predetermined plurality of media assets relating to the category for selection into a user media list and a plurality of social networking services for sharing the user media list, wherein the user media list includes a predetermined number of items such that when a last media asset is added to a last item of the user media list the user media list is fully populated;
        receive a notification that the user media list is fully populated when a media asset of the plurality of media assets is added to the last item of the user media list;
        receive a request to share the user media list through a social networking service from the plurality of social networking services;
        validate credentials for a user account to be associated with the user media list;
        generate a unique locator for viewing of the user media list;
        send an update including the unique locator via the social networking service; and
        enable communication features regarding the user media list.

11. The server of claim 10, wherein the selection into the user media list is by a drag and drop interface.

12. The server of claim 10, wherein the plurality of media assets includes external content.

13. The server of claim 10, wherein the communication features include allowing users of the social networking service to create another user media list from the plurality of media assets relating to the category, wherein the another media list includes the predetermined number of items.

14. The server of claim 10, wherein the social networking service comprises a blog.

15. The server of claim 10, wherein the social networking service comprises a personal user website.

16. The server of claim 10, wherein the unique locator comprises a hashed Universal Resource Locator (URL).

17. The server of claim 10 wherein the processor is further configured to:
    store the user media list in a database.

18. The server of claim 10, wherein the update further includes a portion of the user media list.

* * * * *